Oct. 30, 1951        C. D. ORSINI        2,573,050
METHOD OF EXTRUDING PLASTIC RODS HAVING A SPIRAL DESIGN
Filed Dec. 3, 1948
Fig. 1
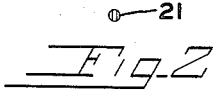
Fig. 2
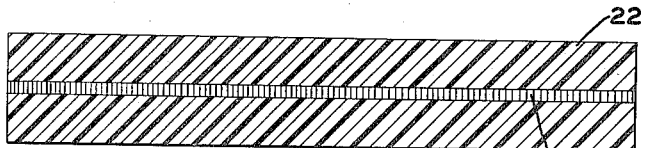
Fig. 3
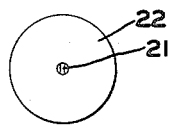
Fig. 4
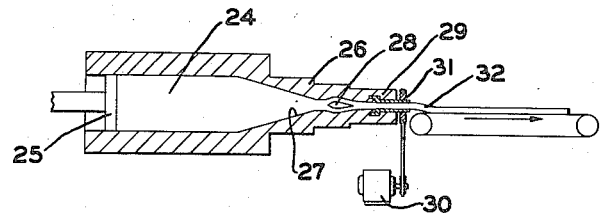
Fig. 5
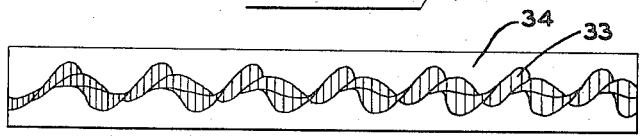
Fig. 6
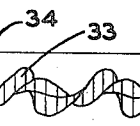
Fig. 7
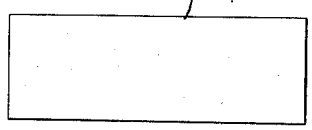
Fig. 8    Fig. 9
Fig. 10
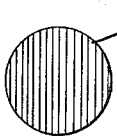
Fig. 11
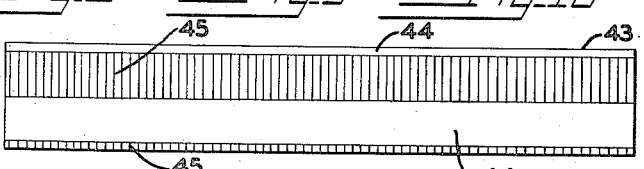
Fig. 12
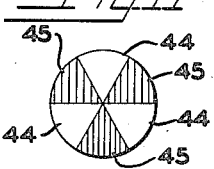
Fig. 13
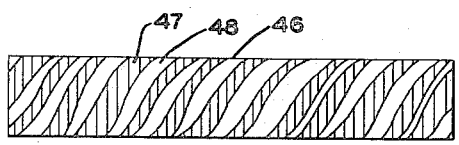
Fig. 14
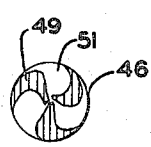
Fig. 15
INVENTOR.
CAMILLO D. ORSINI
BY Clarence B. DesJardins
HIS ATTORNEY Patented Oct. 30, 1951

2,573,050

UNITED STATES PATENT OFFICE 2,573,050

METHOD OF EXTRUDING PLASTIC RODS HAVING A SPIRAL DESIGN

Camillo Dante Orsini, Highland Park, N. J., assignor to Nixon Nitration Works, Nixon, N. J., a corporation of New Jersey Application December 3, 1948, Serial No. 63,306

4 Claims. (Cl. 18—48.8)

This invention relates generally to a method of extruding plastic rods having a spiral design.

In many instances, it is desirable to effect configurations or contrasting color designs in extruded plastic rods. For example, in the manufacture of buttons, plastic rods are extruded and then cut transversely into button discs. Heretofore, it has been possible to ornament these discs, and the buttons made therefrom, only by the application of coloring matter to the individual discs, which is a slow and expensive process.

It is, therefore, a major object of this invention to produce plastic rods having ornamental designs formed in the extruded rod, and, more particularly, to produce a spiral design extending axially of the extruded rod. It is also an object of this invention to provide a method for producing spiral designs extending axially of extruded plastic rods.

In accordance with these objectives, certain features of the present invention reside in the incorporation of different visual characteristics in the charge of material to be extruded and, then, twisting this material, as it is extruded through a die in order to produce a spiral design therein. The plastic rod thus produced has portions of contrasting and differing visual characteristics, forming a spiral or helical configuration extending axially and transversely of the rod. A disc cut from such a rod has an ornamental design extending radially from the center of the disc, formed by the contrasting visual characteristics of the extruded materials.

Other objects and advantages of this invention will become apparent from the detailed description to follow. My invention is clearly defined and pointed out in the appended claims. Preferred embodiments of my invention are set forth in the following specification, taken in connection with the accompanying drawings, wherein:

Fig. 1 is a side elevation of a cylindrical core of plastic material utilized in practicing the method of the present invention;

Fig. 2 is an end view of the cylindrical core shown in Fig. 1;

Fig. 3 is a longitudinal sectional view of a cylindrical charge or "jelly-roll" employing the core of Figs. 1 and 2 and used in carrying out one embodiment of my invention;

Fig. 4 is an end view of the charge shown in Fig. 3;

Fig. 5 is a diagrammatic view of an extruder useful in carrying out the method of my invention;

Fig. 6 is a side elevation of a section of the extruded rod;

Fig. 7 is an end view of the rod shown in Fig. 6;

Fig. 8 is a side elevation of a cylindrical body of plastic material for use in a modified form of the method of the present invention;

Fig. 9 is an end view of the plastic material shown in Fig. 8;

Fig. 10 is a side elevation of a cylindrical body of material similar to Fig. 8, but having different visual characteristics;

Fig. 11 is an end view of the cylindrical body shown in Fig. 10;

Fig. 12 is a view in side elevation of a cylindrical charge or "jelly-roll" for use in extruding rods in accordance with the method of the present invention;

Fig. 13 is an end view of the "jelly-roll" shown in Fig. 12;

Fig. 14 is a side elevation of a plastic rod extruded from the "jelly-roll" shown in Fig. 12, and Fig. 15 is an end view of the plastic rod shown in Fig. 14.

Generally, in accordance with this invention, patterns or configurations are formed in extruded plastic rods by incorporating, in a charge of plasticizable material to be extruded, visually contrasting sections of similar material and, then, extruding this charge into a rod and twisting the rod about its axis as it is extruded. The rod thus produced has a spiral configuration extending along its length. More specifically, sections of plasticizable material having different visual characteristics are assembled to form a cylindrical "jelly-roll" and this composite "jelly-roll" is extruded through a heated rotating die to form the material into a rod and, at the same time, twist the rod as it is extruded, thereby producing an extruded rod having a spiral configuration extending axially thereof and defined by the different visual characteristics of the plastic materials. The "jelly-roll" may be formed by combining sections of plastic material having differing visual characteristics in any desired fashion. For example, the "jelly-roll" may have a cylindrical core of plastic material having one visual characteristic, surrounded by a body of plastic material having a different visual characteristic. When this "jelly-roll" is simultaneously extruded and twisted, a spiral configuration is formed along the axis of the extruded rod. The "jelly-roll" may also be formed by first making two cylindrical bodies of different visual characteristics and dividing them into equal numbers of sectors. Then, by exchanging alternate sectors of the two rolls, a composite roll is produced having alternate sectors of material of different visual characteristics. When this "jelly-roll" is extruded and simultaneously twisted, the rod produced has a spiral design extending axially thereof and also extending radially in curved segments from the central portion to the periphery of the rod. Discs cut from such an extruded rod have symmetrically curved segmented configurations extending radially from the center of the disc to the periphery thereof.

For a more particular description of plastic rods having spirally formed configurations, and of the method of making such rods, reference may be had to the accompanying drawings. Figs. 1 and 2 illustrate a cylindrical core portion 21 of a plasticizable material having a first desired visual characteristic to form the center of a "jelly-roll." About this central portion 21, there is assembled another cylindrical body of plastic material 22 (Fig. 3), having different visual characteristics and forming a standard size charge or "jelly-roll" for use in a "wet" type extrusion machine. For instance, a central opaque portion may be surrounded by a cylindrical body of transparent material. As shown in Figs. 3 and 4, the opaque central core portion 21 is surrounded by an outer transparent portion 22 so the "jelly-roll," is of cylindrical shape and has an axially extending core of a different visual characteristic than the remainder of the "jelly-roll." This composite charge is placed in stuffing cylinder 24 of a "wet" type extruding machine illustrated diagrammatically in Fig. 5. In the stuffing cylinder 24, the composite charge of plastic material is pressed by a ram 25 toward cylinder extension 26, having a passage 27, which tapers to a diameter only slightly larger than the desired diameter of the rod. From the passage 27, the mass, composed of plastic materials having different visual characteristics, is forced through a screen or breaker plate 28, and through a rotating die 31 rotatably mounted on die gate 29. This die 31 is preferably continuously rotated about its axis, as by connections to motor 30, as material is extruded therefrom in the form of a rod 32. Heat is applied by suitable jackets in extension 27 and die gate 29. Thus, as the material is extruded from the die 31, it is continuously twisted about its longitudinal axis, thereby twisting the two plastic materials of different visual characteristics making up the composite charge. As the rod enters die 31 the frictional grip of the rotating die has the effect of moving circumferentially peripheral portions of the rod, which has not set as yet. This simultaneous twisting and extrusion produces a spiral design in the extruded rod 32. In the case illustrated, the spiral design of opaque plastic is visible through the surrounding transparent plastic. This extruded rod is shown, on a larger scale, in Fig. 6, where the material of the first visual characteristic, the opaque material of core 21, is indicated by a spiral design 33, whereas the transparent material 22 of the charge surrounds the spiral design 33 and is indicated at 34.

Of course, if the cylindrical core 21 remained exactly centered with respect to the rest of the rod, there would be very little design resulting. As the cylindrical core portion 21 is invariably offset and distributed somewhat in passing through the spreader and screen 28, offset portions of the opaque material 21 are twisted about the axis of the rod, and thereby produce a spiral configuration extending axially of the extruded rod 32.

Preferably, both the core 21 and the remainder 22 of the "jelly-roll" are made of plasticizable material such as cellulose nitrate for extrusion in the "wet" type process. As illustrated, a particularly effective configuration is attained by providing the core 21 of opaque cellulose nitrate material, while the suppounding portion 22 is of transparent cellulose nitrate composition.

To produce a different type of design, in accordance with a modified version of the present invention, a roll 41, as shown in Figs. 8 and 9, may be formed of plastic material of a first visual characteristic, and a second roll 42, as shown in Figs. 10 and 11, may be formed of a plastic material having a second visual characteristic. For example, one may be opaque and the other transparent, or they may be of different colors. Each of the rolls 41 and 42 is divided into an equal number of longitudinally extending sectors. For example, each of the rolls 41 and 42 may be divided into six sectors. Then, alternate sectors of roll 41 are exchanged with alternate sectors of roll 42 to produce two composite rolls, such as the roll 43 shown in Figs. 12 and 13, which has sectors 44 of a visual characteristic corresponding to roll 41 and alternately arranged sectors 45 of a visual characteristic corresponding to roll 42. The composite roll 43 forms the charge to be placed in chamber 24 of the extruding apparatus and subjected to heat and pressure to extrude a rod through the rotating die 31. By extruding this composite roll 43, and simultaneously twisting the extruded rod as it is being extruded, a plastic rod 46 is produced, having a spiral configuration extending axially thereof and radially from the center to the periphery of the rod, as illustrated in Figs. 14 and 15. On the surface of the extruded rod 46, alternate portions 47 and 48 having different visual characteristics form a helical pattern along the length of the rod. When cut into discs, these same configurations appear on the faces of the discs as symmetrical curved segmental designs, alternately arranged as indicated at 49 and 51.

For those uses where it is desirable to have the ornamental design on the periphery of the rod, a particularly effective design is attained by providing one of the rolls, such as roll 41, of transparent plastic material, whereas the other roll is of opaque material. With this arrangement, the alternate helical designs 47 and 48, appearing on the periphery of the rod, have a pleasant flowing characteristic, because the portions of the spiral design of opaque material lying below the surface of the rod are viewed through the transparent portion of the rod. In other applications, as for making buttons, it may be desirable to use composite rolls, made up of sectors all of which are opaque, but having different color characteristics. There is no limit to the number of different colors that may be used. For example, a roll may be composed of several sectors, each of a different color.

When the composite charge or roll is extruded and the rod twisted as it is extruded, a spiral design is formed along the entire length of the extruded rod. Curved segmental patterns extend from the central portion of the rod radially toward the periphery thereof.

I am aware that the method herein described is susceptible of considerable variation without departing from the spirit of my invention and, therefore, I have claimed my invention broadly, as indicated by the appended claims.

Having thus described my invention, what I claim as new and useful, and desire to secure by Letters Patent, is:

1. The method of forming designs in extruded plastic material comprising the step of extruding with a reciprocating ram a charge of plastic material, having associated portions of differing visual characteristics, through a rotating die from a single stuffing chamber to which the charge is fed as a unit from a single source of supply.

2. The method of forming designs in extruded plastic material comprising the steps of forming a charge having a core of plasticizable material with one visual characteristic and surrounded by plasticizable material of a different visual characteristic, feeding the charge as a unit from a single supply source, and extruding with a reciprocating ram said charge through a rotating die.

3. The method of forming designs in plastic material comprising the steps of forming a charge of plasticizable material having symmetrically arranged longitudinal sections of differing visual characteristics, feeding the charge as a unit to a stuffing chamber from a single supply source, and extruding with a reciprocal ram said charge through a rotatable die.

4. The method of forming designs in extruded plastic material comprising the steps of forming a charge of plastic material having a plurality of associated longitudinally disposed strips of contrasting visual characteristics assembled in a unit, and extruding with a reciprocating ram the charge through a rotating die from a common supply source to a single stuffing chamber for causing said strips to be arranged spirally about the longitudinal axis of the charge.

CAMILLO DANTE ORSINI.

REFERENCES CITED

The following references are of record in the file of this patent:

UNITED STATES PATENTS

| Number | Name | Date |
|---|---|---|
| 1,477,094 | Wilson | Dec. 11, 1923 |
| 2,138,378 | Johnson | Nov. 29, 1938 |
| 2,149,066 | Orsini | Feb. 28, 1939 |
| 2,174,779 | Delorme | Oct. 3, 1939 |
| 2,191,829 | Johnson | Feb. 27, 1940 |
| 2,347,036 | Dumont | Apr. 18, 1944 |